US007004053B1

(12) United States Patent
Franklin et al.

(10) Patent No.: US 7,004,053 B1
(45) Date of Patent: Feb. 28, 2006

(54) SYSTEM FOR MEASURING AND CONTROLLING CUT LENGTH OF DISCRETE COMPONENTS IN A HIGH-SPEED PROCESS

(75) Inventors: Kent Allan Franklin, Appleton, WI (US); Henry L. Carbone, Appleton, WI (US); David P. Hunter, Appleton, WI (US); Robert Lee Popp, Hortonville, WI (US); Gregory M. Blincoe, Appleton, WI (US); Christopher S. Larsen, Wisconsin Rapids, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/526,037

(22) Filed: Mar. 15, 2000

(51) Int. Cl.
*B23Q 15/20* (2006.01)
*B26D 5/00* (2006.01)

(52) U.S. Cl. .................... 83/37; 83/42; 83/74; 83/312; 83/358; 83/949

(58) Field of Classification Search .................... 83/73, 83/74, 358, 14, 17, 18, 37, 42, 72, 175, 312, 83/313, 359, 649, 948, 949
See application file for complete search history.

(56) References Cited

U.S. PATENT DOCUMENTS 3,199,391 A * 8/1965 Haner et al. .................. 83/359
3,324,751 A * 6/1967 Rubinstein et al. ............ 83/73
3,406,601 A * 10/1968 Clifford ......................... 83/72
3,879,246 A 4/1975 Walker
4,020,406 A 4/1977 Tokuno et al.
4,038,127 A 7/1977 Bullock, Jr. et al.
RE30,628 E 5/1981 Tokuno et al.
4,375,175 A 3/1983 Elsas et al. .................... 83/18
4,445,408 A * 5/1984 Keith ............................ 83/37
4,543,863 A * 10/1985 Rader ............................ 83/76
4,635,511 A * 1/1987 Shirasu .......................... 83/74
4,719,575 A 1/1988 Gnuechtel
4,781,317 A 11/1988 Ditto
4,837,715 A 6/1989 Ungpiyakul et al.
5,000,725 A 3/1991 Bauknecht
5,045,135 A 9/1991 Meissner et al.
5,095,219 A 3/1992 Laumann et al.
5,123,316 A 6/1992 Niedermaier et al. .......... 83/29
5,235,515 A 8/1993 Ungpiyakul et al.
5,241,884 A 9/1993 Smithe et al.
5,286,317 A 2/1994 Treat et al.
5,286,543 A 2/1994 Ungpiyakul et al.
5,316,229 A 5/1994 Draghetti
5,359,525 A 10/1994 Weyenberg
5,380,381 A 1/1995 Otruba (Continued)

FOREIGN PATENT DOCUMENTS

WO WO 98/21035 5/1998

(Continued)

*Primary Examiner*—Clark F. Dexter
(74) *Attorney, Agent, or Firm*—Pauley Petersen & Erickson

(57) ABSTRACT

A closed-loop system can maintain a pre-set cut length of a material as the material is cut and placed on a web. The system has the ability to measure the actual cut length, compare the average actual cut length to a target cut length, and to adjust web tension or feed roll speed to achieve the target cut length. Actual cut length variation is thereby reduced. Furthermore, short term cut length variation is further reduced by minimizing the tension of the web just prior to the material being cut.

25 Claims, 2 Drawing Sheets

U.S. PATENT DOCUMENTS 5,383,988 A 1/1995 Herrmann et al.
5,407,507 A 4/1995 Ball
5,407,513 A 4/1995 Hayden et al.
5,413,651 A 5/1995 Otruba
5,480,085 A 1/1996 Smithe et al. ................ 226/44
5,639,335 A 6/1997 Achilles et al. ............. 156/353
5,659,538 A 8/1997 Stuebe et al.
5,766,389 A 6/1998 Brandon et al.
5,818,719 A 10/1998 Brandon et al.
5,899,128 A 5/1999 Smithe et al. ................. 83/76
5,930,139 A 7/1999 Chapdelaine et al.
5,932,039 A 8/1999 Popp et al.

FOREIGN PATENT DOCUMENTS

WO WO 98/21134 5/1998
WO WO 98/21135 5/1998

* cited by examiner

SYSTEM FOR MEASURING AND CONTROLLING CUT LENGTH OF DISCRETE COMPONENTS IN A HIGH-SPEED PROCESS

FIELD OF THE INVENTION

This invention is directed to a closed-loop control system for controlling the cut length of a material. More specifically, the cut length is adjusted by changing feed roll speed or web tension.

BACKGROUND OF THE INVENTION

A number of different manufacturing processes are used to cut continuous webs of material, such as elastic material, including stretch bonded laminates, into discrete lengths prior to placement on a second continuous web. Such processes are typically carried out by open-loop control systems that change web tension through each roll of material to adjust for through-roll variations in cut length. A problem encountered with these types of systems is that they assume a consistent material property profile through each roll of material, thereby providing no means to control cut length if the material property profile through each roll of material is different. Also, no means are provided to maintain the web tension at a minimum to reduce cut length variation. Consequently, the higher cut length variation translates into higher material trim waste and poor quality product.

SUMMARY OF THE INVENTION

The present invention is directed to a closed-loop system that maintains a pre-set cut length of an elastic material, such as a stretch bonded laminate, as the material is cut and placed on a web, taking into account changes in the elastic properties of the material. The system has the ability to measure the cut length, compare the average cut length to a target cut length, and to adjust web tension or feed roll speed to achieve the target cut length. Also, in a preferred embodiment of the system, the system is able to maintain the web tension at a minimum to reduce cut length variation, and adjust the feed roll speed to achieve the target cut length.

With the foregoing in mind, it is a feature and advantage of the invention to provide a process for controlling the cut length of a continuous material.

It is another feature and advantage of the invention to provide apparatus for controlling the cut length of a continuous material.

DEFINITIONS

"Elastic" and "Elasticity" refer to the tendency of a material, or composite material, to recover its original size and shape after removal of the force causing a deformation.

"Modulus of elasticity" refers to a constant that numerically measures or represents the amount of elasticity a material possesses.

"Operatively connected" means joining, attaching, connecting, or the like, of a first element and a second element either directly or indirectly by means of an additional element disposed between the first element and the second element.

"Stretch bonded laminate" refers to a composite material having at least two layers in which one layer is a gatherable layer and the other layer is an elastic layer. The layers are joined together when the elastic layer is in an extended condition so that upon relaxing the layers, the gatherable layer is gathered.

"Tension" refers to a force tending to cause the extension of a body, or the balancing force within that body resisting the extension.

DETAILED DESCRIPTION OF THE PRESENTLY PREFERRED EMBODIMENTS

The present invention is directed to a system that reduces cut length variation by providing a closed-loop cut length control and a way to reduce web tension at a cut-off module. This system has the capability to adjust for changes in elastic material properties in through-roll and roll-to-roll applications. This system also allows higher web tension at an unwind end of the system which may be required to overcome roll blocking or idler inertia. Furthermore, short term cut length variation can be reduced by providing a way to minimize the tension of the web just prior to a material's entrance into a cut-off module from a driven roll.

This system is designed to measure and control cut lengths of discrete components in high-speed processes. More particularly, the system is applicable for machines running at speeds in excess of 300 products/min and can even be used with machines running at speeds above 500 products/min. The maximum speed at which the system can be used is limited by the capability of the components used in the system.

Figure 1:
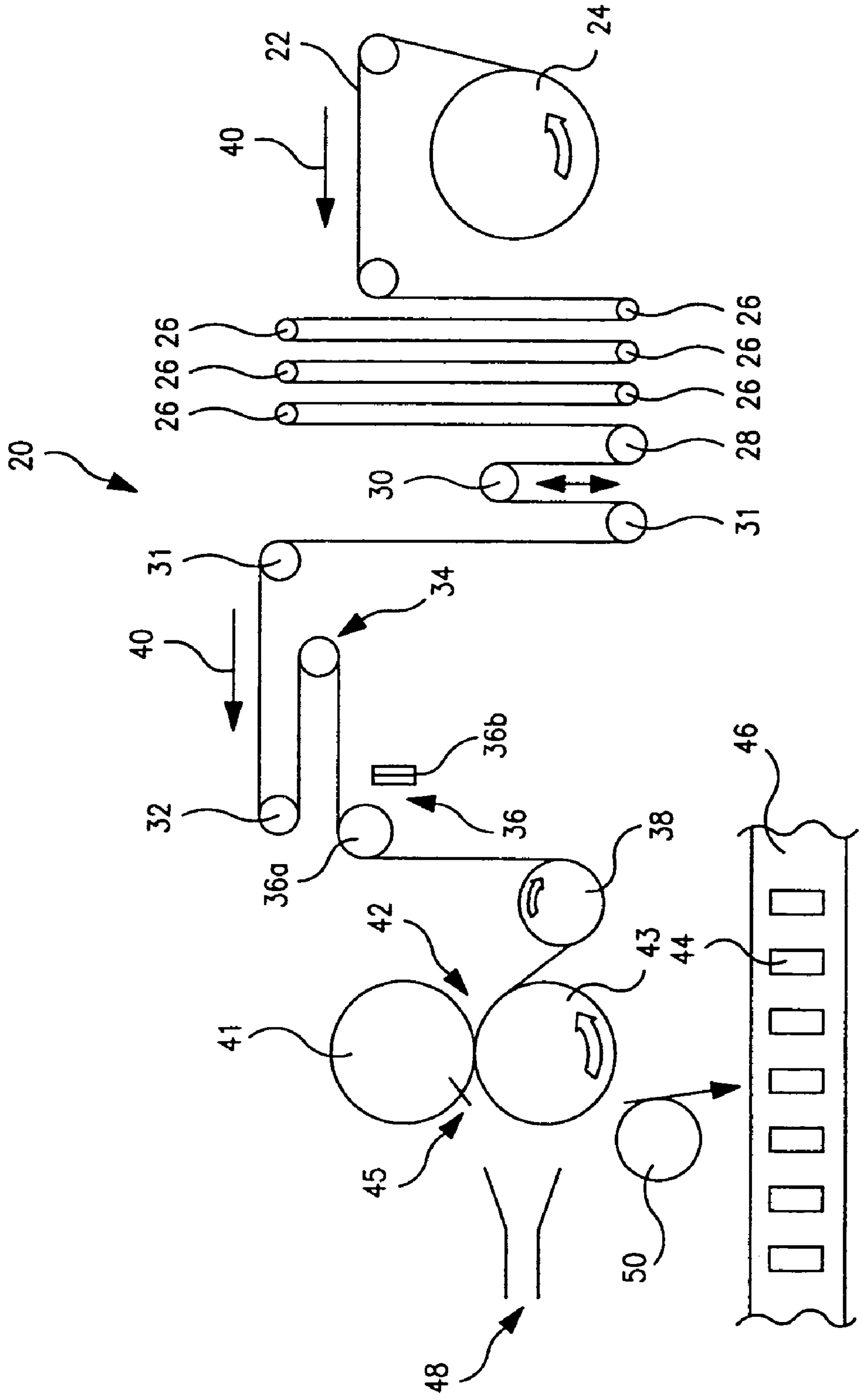
FIG. 1 illustrates schematically a preferred control system for reducing cut length variation of a continuous material.

Referring now to FIG. 1, there is schematically shown a preferred control system 20 of the present invention for reducing cut length variation in a continuous elastic material 22, including stretch bonded laminates. The system 20 includes an unwind spindle 24 from which the elastic material 22 is unwound and fed through the system 20. Once the elastic material 22 leaves the unwind spindle 24, the material travels around a plurality of rolls 26 to a first driving device 28, such as a driven roll. The first driving device 28 can be run at a speed greater than the speed of the unwind spindle 24, thereby resulting in relatively high tension which may be required to overcome roll blocking or idler inertia from the unwind spindle 24. High tension at the unwind spindle 24 may be required in both through-roll and roll-to-roll applications in order to overcome roll blocking or idler inertia.

Between the first driving device 28 and a second driving device 32, the material 22 is guided around a dancer roll 30 as a means to control the tension between the two driving devices 28, 32. Between the dancer roll 30 and the second driving device 32, the material 22 is guided around a couple of stationary rolls 31. After passing over the second driving device 32, the material 22 is directed around a tension measuring device 34, and the amount of tension in the material 22 is measured at that point. The material 22 then makes its way around a web guide 36, shown as a two-part device 36*a* and 36*b*, to a feed roll 38. The web guide 36 is used to control the positioning of the material 22 along a cross-direction of the process. For the purposes of the present invention, the cross-direction lies generally within the plane of the material 22 being transported through the process and is aligned perpendicular to the machine direction. The machine direction is indicated by arrows 40 in FIG. 1.

From the feed roll 38, the material 22 is fed into a cut-off module 42 where the material is cut into pieces 44 of discrete length. The cut-off module 42 includes a nip roll 41, an anvil roll 43, and one or more cutting mechanisms (e.g. blades 45) on either the nip roll 41 or the anvil roll 43 for cutting the elastic material 22 into pieces 44 of predetermined length. Once the material 22 is cut, the discrete length of the pieces 44 of the material is detected/measured by a detection system 48 either on the anvil roll 43 or after the pieces 44 are transferred to a second web 46. The preferred location for the detection system 48 is as close to the cut-off module 42 as possible to minimize lag time in the system 20. A transfer device 50, or the anvil roll 43, can be used to transfer the pieces 44 from the cut-off module 42 to the second web 46. The transfer device 50 can be either a transfer roll or a conveyor. Similarly, the second web 46 can be either a web or a conveyor.

Figure 2:
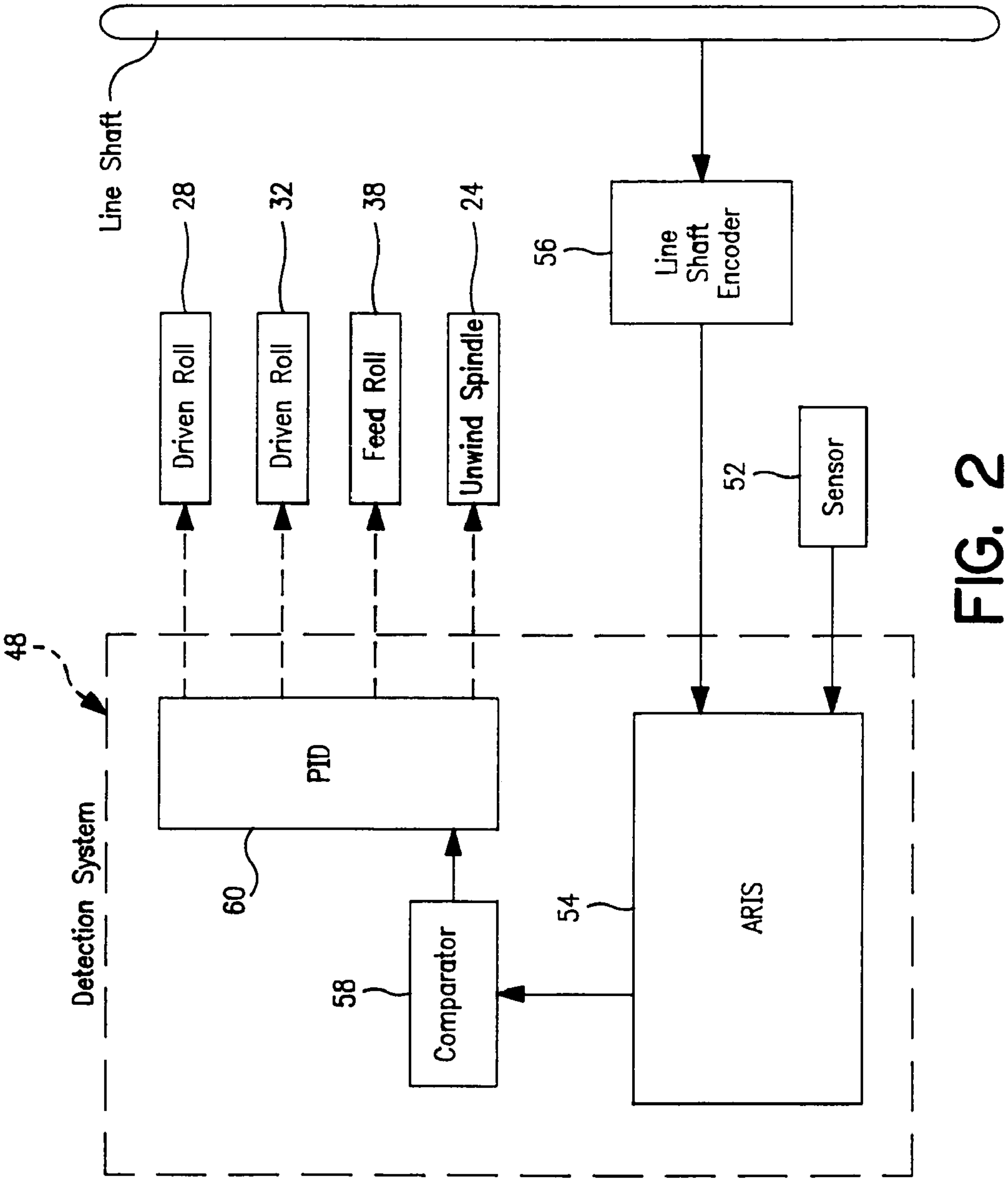
FIG. 2 illustrates schematically a preferred measurement detection device used in the control system of the present invention.

The detection system 48 may include a vision system or a photoeye. An example of a preferred detection system 48 is shown schematically in FIG. 2. The detection system 48 uses a sensor 52, such as a Banner R55C62QP Color Mark Sensor available from Banner Engineering Corp. of Minneapolis, Minn., to detect the presence of each piece 44 on the anvil roll 43 immediately following the cut. Alternatively, as mentioned, the presence of each piece 44 can be detected while the piece 44 is either on the transfer device 50 or on the second web 46.

The sensor 52 produces a first type of signal, such as a "high" signal, when it detects the presence of the piece 44 and a second type of signal, such as a "low" signal, when it does not detect the presence of the piece 44. The first type of signal triggers an automatic registration and inspection system (ARIS) 54 to capture a starting count from a line shaft encoder 56. The second type of signal triggers ARIS 54 to capture an ending count from the line shaft encoder 56. ARIS 54 then determines the total number of encoder counts during which the sensor 52 detected the presence of each piece 44 and converts the number of encoder counts into an actual millimeter measurement representing the actual cut length of each piece 44.

A comparator 58 then compares the actual measurement to a target cut length. If the difference between the actual measurement and the target cut length is not equal to zero, the speed of the driving devices 28, 32 and/or the feed roll 38 and/or the unwind spindle 24 is increased or decreased through a proportional integral derivative (PID) control system 60 which is optimally tuned to achieve the target cut length. The PID 60 is operatively connected to the driving devices 28, 32 and/or the feed roll 38 and/or the unwind spindle 24, thereby having the capability to increase or decrease speed in view of the target cut length. The magnitude of the feed roll speed changes depends on the tension of the elastic material 22 and the material properties of the elastic material.

In a preferred embodiment of the invention, the web tension immediately preceding the feed roll 38 is minimized to minimize cut length variation. In an alternative embodiment, the feed roll 38 can be maintained at a constant speed and the tension in the material 22 preceding the feed roll 38 can be changed by modulating the speeds of driving devices 32, 28 and/or the unwind spindle 24.

As product developers require materials with a lower modulus of elasticity, the challenge to minimize cut length variation will increase. The present invention provides a way to minimize tension into a cut-off module 42 and minimize cut length variation, even in lower modulus elastic materials.

EXAMPLES

The following examples were achieved using a Banner Photoeye looking at an anvil roll. A Banner R55C62QP Color Mark Sensor was used as input to ARIS for these trials. Measurements from both a camera and the Photoeye were made to samples of a stretch bonded laminate material, having a relaxed thickness of approximately 0.053 inches (0.13 cm) and an approximate basis weight of 3.047 ounces per square yard, after the material passed through a cut-off module. The samples were collected for approximately one minute each. An electronic datalog function was used to collect the calculated cut length measurement results from ARIS. The initial cut length setting used was 84 mm per product. Product was collected after it passed through the cut-off module and was manually measured and recorded. Four sample sets were collected and analyzed. The data below shows that panels in process could be accurately measured within approximately 1 mm.

Example 1

No change to cut length setting—cut length was set at ~84 mm per product.

ARIS Measurements (500 products): AVG=83.9 mm STD=0.98 mm

Manual Measurement (18 products): AVG=83.3 mm STD=0.69 mm

Example 2

Cut length setting was increased by 2 mm/product to ~86 mm/product.

ARIS Measurements (500 products): AVG=85.8 mm STD=0.85 mm

Manual Measurement (18 products): AVG=86.1 mm STD=0.94 mm

Example 3

Cut length setting was increased another 2 mm/product to ~88 mm/product.

ARIS Measurements (500 products): AVG=87.8 mm STD=0.81 mm

Manual Measurement (18 products): AVG=88.2 mm STD=0.71 mm

Example 4

Cut length setting was decreased by 4 mm/product from original to ~80 mm/product.

ARIS Measurements (500 products): AVG=80.3 mm STD=0.83 mm

Manual Measurement (18 products): AVG=80.6 mm STD=0.62 mm

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

We claim:

1. A process for cutting a material into pieces having a predetermined target length, comprising the steps of:

feeding a continuous web of the material from a feed roll to a cut-off module;

measuring tension in the web;

using the cut-off module to cut a piece of the material from the continuous web;

measuring an actual length of the piece of material;

comparing the actual length of the piece of material to the target length; and adjusting the tension in the web prior to the web encountering the feed roll in response to any difference between the actual length and the target length.

2. The process of claim 1 further comprising the step of placing the piece of material on a second web of material.

3. The process of claim 2 wherein the actual length of the piece of material is measured prior to the piece's placement on the second web.

4. The process of claim 2 wherein the actual length of the piece of material is measured after the piece is placed on the second web.

5. The process of claim 1 further comprising the step of placing the piece of material on a conveyor.

6. The process of claim 5 wherein the actual length of the piece of material is measured prior to the piece's placement on the conveyor.

7. The process of claim 5 wherein the actual length of the piece of material is measured after the piece is placed on the conveyor.

8. The process of claim 1 wherein the tension in the web is measured prior to the web encountering the feed roll.

9. The process of claim 1 wherein the tension in the web is measured between the feed roll and the cut-off module.

10. The process of claim 1 wherein the step of measuring the actual length includes producing a first signal when the piece is sensed, and producing a second signal when the piece is not sensed.

11. The process of claim 10 wherein the first signal triggers a device to capture a starting count and the second signal triggers the device to capture an ending count.

12. The process of claim 11 wherein the device determines a total number of encoder counts and converts the number of encoder counts into the actual length.

13. The process of claim 12 wherein a non-zero difference between the actual length and the target length triggers the tension adjusting step.

14. The process of claim 1 wherein the tension-adjusting step includes the step of modulating the web tension such that the web tension is kept to a minimum.

15. A process for cutting an elastic material into pieces having a predetermined target length, comprising the steps of:

feeding a continuous web of the elastic material from a feed roll to a cut-off module;

measuring tension in the web prior to the web encountering the feed roll;

using the cut-off module to cut a piece of the elastic material from the continuous web;

measuring an actual length of the piece of elastic material which includes producing a first signal when the piece is sensed, and producing a second signal when the piece is not sensed;

comparing the actual length of the piece of elastic material to the target length; and adjusting the feed roll's speed in response to any difference between the actual length and the target length.

16. The process of claim 15, further comprising the step of maintaining the web tension at a minimum immediately preceding the feed roll.

17. The process of claim 15 further comprising the step of placing the piece of material on a second web of material.

18. The process of claim 17 wherein the actual length of the piece of material is measured prior to the piece's placement on the second web.

19. The process of claim 17 wherein the actual length of the piece of material is measured after the piece is placed on the second web.

20. The process of claim 15 further comprising the step of placing the piece of material on a conveyor.

21. The process of claim 20 wherein the actual length of the piece of material is measured prior to the piece's placement on the conveyor.

22. The process of claim 20 wherein the actual length of the piece of material is measured after the piece is placed on the conveyor.

23. The process of claim 15 wherein the first signal triggers a device to capture a starting count and the second signal triggers the device to capture an ending count.

24. The process of claim 23 wherein the device determines a total number of encoder counts and converts the number of encoder counts into the actual length.

25. The process of claim 24 wherein a non-zero difference between the actual length and the target length triggers the feed roll speed adjusting step.

* * * * *